United States Patent
Otsuka

(10) Patent No.: US 9,367,508 B2
(45) Date of Patent: Jun. 14, 2016

(54) INTERFACE CONFIGURATION FOR A MEMORY CARD AND MEMORY CARD CONTROL DEVICE

(71) Applicant: Panasonic Corporation, Osaka (JP)

(72) Inventor: Takeshi Otsuka, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 80 days.

(21) Appl. No.: 14/299,383

(22) Filed: Jun. 9, 2014

(65) Prior Publication Data

US 2015/0248368 A1  Sep. 3, 2015

(30) Foreign Application Priority Data

Mar. 3, 2014 (JP) ................................. 2014-040456

(51) Int. Cl.
*G06F 12/00* (2006.01)
*G06F 13/00* (2006.01)
*G06F 13/40* (2006.01)

(52) U.S. Cl.
CPC .... *G06F 13/4068* (2013.01); *G06F 2212/2146* (2013.01)

(58) Field of Classification Search
None
See application file for complete search history.

(56) References Cited

U.S. PATENT DOCUMENTS

| | | | | |
|---|---|---|---|---|
| 5,841,979 A * | 11/1998 | Schulhof | ................ | G11B 20/10 700/94 |
| 7,908,417 B2 * | 3/2011 | Cho | ..................... | G06F 9/4406 710/300 |
| 7,987,308 B2 * | 7/2011 | Jo | ........................ | G06F 13/387 365/63 |
| 2003/0176937 A1 * | 9/2003 | Janky | ..................... | H04L 69/04 700/94 |
| 2005/0005059 A1 * | 1/2005 | Tanaka | .................. | G06F 3/0613 711/103 |
| 2007/0001017 A1 * | 1/2007 | Nuri | ..................... | G06F 13/385 235/492 |
| 2009/0210738 A1 * | 8/2009 | Kimura | ..................... | G06F 1/30 713/340 |
| 2009/0236416 A1 * | 9/2009 | Morita | ............ | G06K 19/07743 235/380 |
| 2010/0131707 A1 * | 5/2010 | Chi | ........................ | G06F 13/385 711/115 |
| 2011/0029745 A1 * | 2/2011 | Nakahama | ............ | G06F 13/385 711/154 |
| 2012/0117315 A1 | 5/2012 | Okada | | |
| 2012/0159008 A1 * | 6/2012 | Park | ..................... | G06F 13/387 710/15 |
| 2013/0166843 A1 * | 6/2013 | Fujimoto | ............... | G11C 5/143 711/115 |
| 2014/0289466 A1 * | 9/2014 | Tsujii | .................. | H04N 1/2112 711/115 |
| 2015/0227184 A1 * | 8/2015 | Berke | ..................... | G06F 1/263 713/340 |

FOREIGN PATENT DOCUMENTS

JP  2011-28433 A  2/2011

* cited by examiner

*Primary Examiner* — Sean D Rossiter

(74) *Attorney, Agent, or Firm* — Renner, Otto, Boisselle & Sklar, LLP

(57) ABSTRACT

Card detection pin and input pin configured to receive an interface reset signal are connected to each other in a high-speed data transfer memory card. A memory card control device noncompliant with the memory card initializes the interface reset signal to a memory card to a second electric potential, and then when the memory card control device detects a first electric potential of the card detection pin of the memory card, the memory card control device determines that the memory card is mounted. When the memory card is mounted in such a memory card control device, the memory card control device does not detect the mounting of the memory card, and thus does not start subsequent operation such as driving the interface reset signal to the first electric potential and supplying electric power to the memory card.

6 Claims, 13 Drawing Sheets

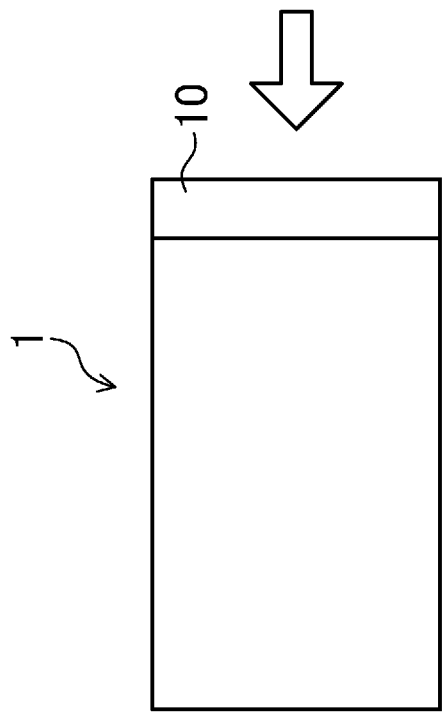

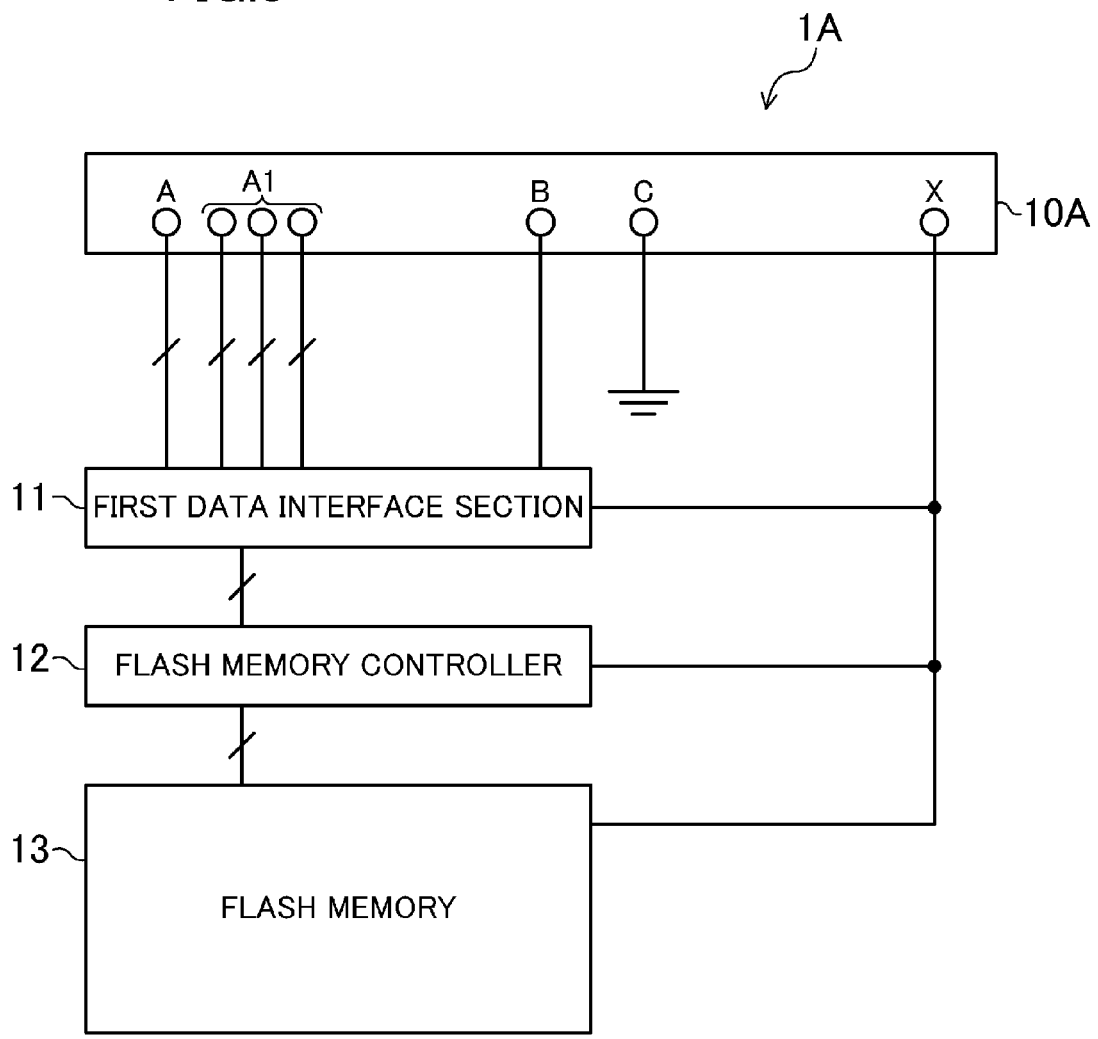

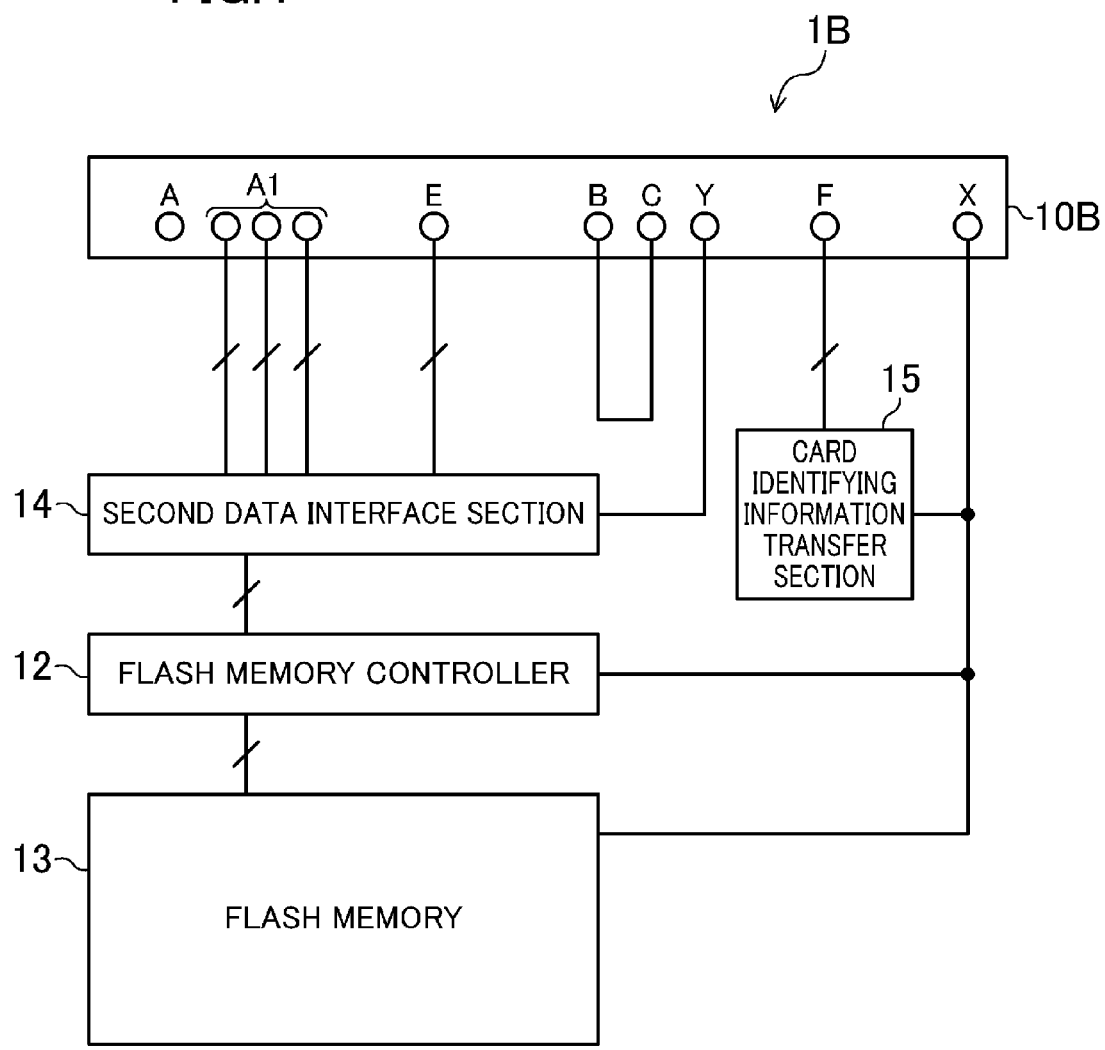

INTERFACE CONFIGURATION FOR A MEMORY CARD AND MEMORY CARD CONTROL DEVICE

CROSS-REFERENCE TO RELATED APPLICATION

This application claims priority to Japanese Patent Application No. 2014-040456 filed on Mar. 3, 2014, the entire disclosure of which is incorporated by reference herein.

BACKGROUND

The present disclosure relates to memory cards, and memory card control devices for controlling access to the memory cards.

As the transfer speed of a flash memory increases, the data transfer system of a memory card is being changed from a parallel data transfer system to a differential serial data transfer system.

In a memory card according to a conventional technique, a second pin group is added to a first pin group, so that the first pin group serves as a pin exclusively used for parallel data transfer, and the second pin group serves as a pin exclusively used for differential serial data transfer. When the memory card is mounted in a memory card control device noncompliant with the second pin group, the memory card operates on the parallel data transfer system, and when the memory card is mounted in a memory card control device compliant with the second pin group, the memory card operates on a high-speed differential serial data transfer system (see, Japanese Unexamined Patent Publication No. 2011-28433).

SUMMARY

The present disclosure provides a high-speed data transfer memory card which includes no additional pin and causes neither malfunction nor an electric breakdown even when high-speed data transfer memory card is mounted in a memory card control device noncompliant therewith.

The present disclosure further provides a memory card control device including an interface compliant with the high-speed data transfer memory card.

A memory card according to the present disclosure is a memory card, access to which is controlled by a memory card control device, the memory card including: a card detection pin configured to allow the memory card control device to detect mounting/demounting of the memory card; and an input pin configured to receive an interface reset signal output from the memory card control device, wherein the card detection pin and the input pin configured to receive the interface reset signal are connected to each other in the memory card.

A memory card control device according to the present disclosure is a memory card control device for controlling access to a memory card, the memory card control device including: a reset signal driver configured to drive an interface reset signal to the memory card at a first electric potential; a mounting/demounting detector configured to determine that the memory card is mounted when an electric potential of a terminal connected to a card detection pin of the memory card via a memory card connector of the memory card control device is the first electric potential, and that the memory card is not mounted when the electric potential of the terminal connected to the card detection pin of the memory card is a second electric potential, a first electric power supply configured to, only when the mounting/demounting detector determines that the memory card is mounted, supply first electric power to the mounted memory card; a card identifying section configured to receive card identifying information transmitted from the mounted memory card by supplying the first electric power to the mounted memory card, and determine whether or not the mounted memory card is a specific type of memory card, a second electric power supply configured to, only when the card identifying section determines that the mounted memory card is the specific type of memory card, supply second electric power to the mounted memory card; and a data interface section configured to perform date transfer with the mounted memory card via an interface enabled in the mounted memory card by supplying the second electric power to the mounted memory card when the mounted memory card is the specific type of memory card.

A memory card according to the present disclosure includes a card detection pin and an input pin configured to receive an interface reset signal, where the card detection pin and the input pin are connected to each other in the memory card. On the other hand, a memory card control device noncompliant with the memory card initializes the interface reset signal to the memory card to a second electric potential, and then when the memory card control device detects a first electric potential of the card detection pin of the memory card via a memory card connector, the memory card control device determines that the memory card is mounted, and after detecting the mounting of the memory card, the memory card control device drives the interface reset signal to the first electric potential, and supplies electric power to the memory card. When the memory card according to the present disclosure is mounted in such a memory card control device, the memory card control device receives the interface reset signal of the second electric potential as the electric potential of the card detection pin, the memory card control device does not detect the mounting of the memory card. Therefore, the memory card control device cannot start operation such as driving the interface reset signal to the first electric potential and supplying electric power to the memory card. Thus, it is possible to prevent malfunction of the memory card control device and an electric breakdown relating to an interface between the memory card control device and the memory card.

The memory card control device according to the present disclosure drives the interface reset signal to the memory card at the first electric potential. Therefore, mounting of the memory card can be detected although the card detection pin and the input pin configured to receive the interface reset signal are connected to each other in the memory card. Moreover, when the memory card control device according to the present disclosure receives card identifying information indicating that the memory card is a high-speed data transfer memory card from the memory card, the memory card control device enables a high-speed data transfer interface in the memory card, so that high-speed data transfer can be achieved.

BRIEF DESCRIPTION OF THE DRAWINGS

FIG. 2A is a top view illustrating the memory card of FIG. 1, and FIG. 2B is a view illustrating an external interface pin on a side surface of the memory card.

FIG. 3 is a view illustrating an internal configuration of a first memory card.

FIG. 4 is a view illustrating an internal configuration of a second memory card.

FIG. 5A is a view illustrating a second data interface including no additional lane, and FIGS. 5B0-5B3 are views illustrating second data interfaces including additional lanes.

DETAILED DESCRIPTION

Embodiments are described in detail below with reference to the attached drawings. However, unnecessarily detailed description may be omitted. For example, detailed description of well-known techniques or description of the substantially same elements may be omitted. Such omission is intended to prevent the following description from being unnecessarily redundant and to help those skilled in the art easily understand it.

The inventor provides the following description and the attached drawings to enable those skilled in the art to fully understand the present disclosure. Thus, the description and the drawings are not intended to limit the scope of the subject matter defined in the claims.

First Embodiment

With reference to FIGS. 1-13, embodiments will be described below.

[1. Configuration]
[1-1. System Configuration]

A memory card system of the present disclosure includes a memory card and a memory card control device. The memory card is one of two types of memory cards, and the memory card control device is one of three types of memory card control devices.

The two types of memory cards have a common specification of pins of an internal interface, but have different external interfaces. In the following description, a memory card having a first data interface is defined as a first memory card, and a memory card having a second data interface is defined as a second memory card. For example, the first data interface is a peripheral component interconnect (PCI) bus, and the second data interface is a higher-speed PCI-Express bus. In the embodiments, a memory card having a PCI bus is the first memory card, and a high-speed data transfer memory card having a PCI-Express bus is the second memory card.

The three types of memory card control devices are A, B and C types. The A-type memory card control device is defined as a memory card control device which performs data transfer with the first memory card, but does not perform data transfer with the second memory card. The B-type memory card control device is defined as a memory card control device which performs data transfer with both the first memory card and the second memory card. The C-type memory card control device is defined as a memory card control device which does not perform data transfer with the first memory card, but is capable of performing data transfer with the second memory card at a higher speed than the B-type memory card control device.

Figure 1:
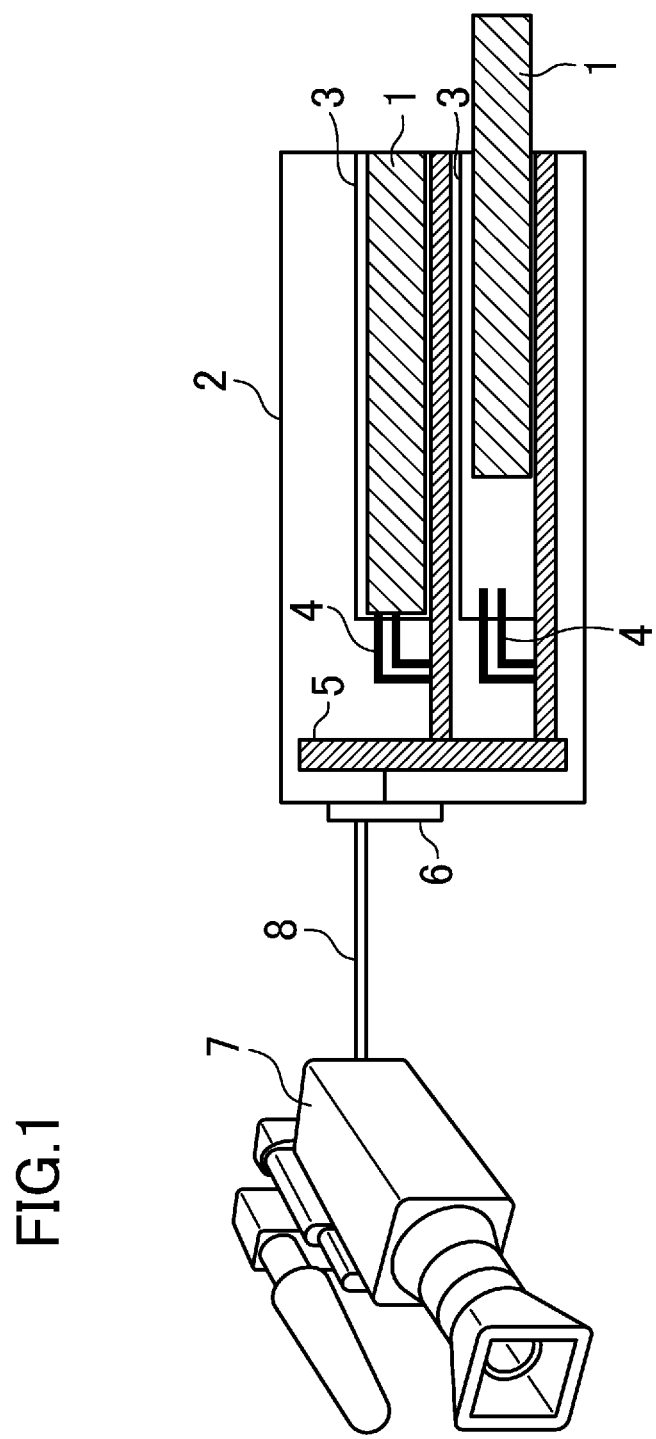
FIG. 1 is a view illustrating an example use of a memory card control device and a memory card according to a first embodiment.

FIG. 1 illustrates an example use of a memory card system including a memory card control device and a memory card according to the first embodiment. The example use illustrated in FIG. 1 is applicable to all of the above-described two types of memory cards and the above-described three types of memory card control devices.

In FIG. 1, reference number 1 denotes a memory card, and reference number 2 denotes a memory card control device. The memory card control device 2 includes two memory card sockets 3 in which the memory cards 1 are inserted, memory card connectors 4 connecting the memory card sockets 3 to a circuit board 5, and an external input/output section 6. The external input/output section 6 is connected to a camera 7 via a connector 8. Image data captured by the camera 7 is stored in the memory card 1 via the memory card control device 2.

FIGS. 2A and 2B are views illustrating an outline of external interface pins of the two types of memory cards. FIG. 2A is a top view of the memory card 1, where external interface pins of the memory card 1 are arranged on a side surface of the memory card 1 viewed in a direction of the arrow. Reference number 10 in FIG. 2A denotes a pin connector of the memory card 1, and each pin is mounted at the depth of a corresponding one of small-diameter holes 10a of the pin connector 10 of FIG. 2B. When the memory card 1 is mounted in the memory card socket 3 of the memory card control device 2, each pin of the pin connector 10 of the memory card 1 is connected to a corresponding one of terminals of the memory card connector 4 of the memory card control device 2.

[1-2. Configuration of Memory Card]

FIG. 3 is a view illustrating an internal configuration of a first memory card 1A. FIG. 4 is a view illustrating an internal configuration of the second memory card 1B.

In FIG. 3, reference symbol 10A denotes a pin connector of the memory card 1A, and the pin connector 10A includes a connector having a plurality of external interface pins. Each of circles in the pin connector 10A represents one external interface pin or a plurality of external interface pins, where reference symbol A denotes pins exclusively used for the first data interface, and reference symbol A1 denotes pins used for both the first data interface and the second data interface. Reference symbol B denotes a pin to which an interface reset signal for resetting the first data interface is assigned, and reference symbol C denotes a card detection pin, which is fixed to GND in the card. Reference symbol X denotes a first electric power supply pin, which supplies electric power to the entire circuit mounted on the memory card 1A.

Reference number 11 denotes a first data interface section, which performs data transfer with the memory card control device 2 via the A pins and the A1 pins of the pin connector 10A. Device information is registered in a register of the first data interface section 11. Reference number 12 denotes a flash memory controller by which data transmitted via the first data interface section 11 is read from or written to a built-in flash memory 13.

Next, the second memory card 1B illustrated in FIG. 4 will be described mainly in terms of structural differences from the first memory card 1A illustrated in FIG. 3. The second memory card 1B includes a second data interface section 14 instead of the first data interface section 11, and A1 pins, E pins, and a Y pin of a pin connector 10B are connected to the second data interface section 14. The E pins of the pin connector 10B are pins exclusively used for the second data interface, and the A1 pins of the pin connector 10B are pins used for both the first data interface and the second data interface. Pin Y is a pin for supplying electric power to the second data interface section 14.

When the second data interface has four data transfer lanes at maximum, a basic lane of the four lanes is connected to the E pins of the pin connector 10B, and additional three lanes are connected to the A1 pins of the pin connector 10B. In this example, data is transmitted by being distributed to each lane in units of one byte.

FIG. 5A is a view illustrating the second data interface in the case where no additional lane is available, and FIGS. 5B0-5B3 are views illustrating the second data interface in the case where additional lanes are available. That is, data transfer using only a basic lane of the second data interface is shown in FIG. 5A, and data transfer using a total of four lanes including the basic lane and additional three lanes is shown in FIGS. 5B0-5B3. Reference symbols D0, D1 in FIG. 5A denote transfer bytes, and in the case where only the basic lane is available, 12 bytes, i.e., D0-D11 are transferred. Within a time period in which the 12 bytes are transferred, 48 bytes, i.e., D0-D47 can be transferred when the transfer is performed by using the four lanes. Thus, using the additional lanes in the second data interface allows transfer at a speed four times as high as the speed of transfer using only the basic lane.

As described above, the second data interface section 14 performs data transfer with the memory card control device 2 via the E pins and the A1 pins of the pin connector 10B. Unlike the first memory card 1A, card detection pin C of the pin connector 10B is directly connected to interface reset signal input pin B of the pin connector 10B in the memory card. F pins of the pin connector 10B are accompanying information interface pins for transmitting card identifying information indicating that the memory card is the second memory card 1B by using, for example, an inter-integrated circuit (I2C) bus, and a card identifying information transfer section 15 controls the I2C bus for transmitting the accompanying information.

[1-3. Configuration of Memory Card Control Device]

Figure 6:
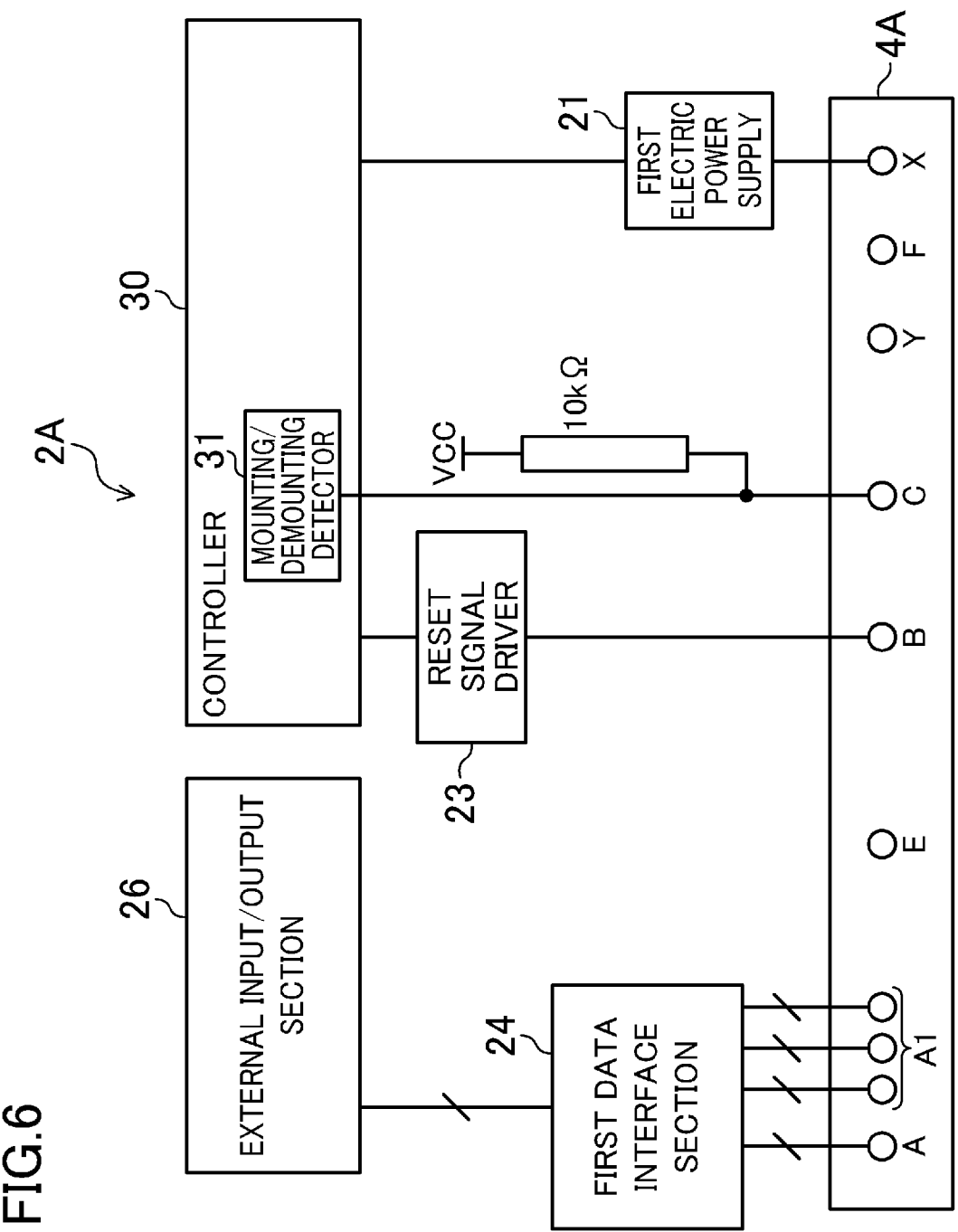
FIG. 6 is a view illustrating a configuration of an A-type memory card control device which performs data transfer with only the first memory card.
Figure 7:
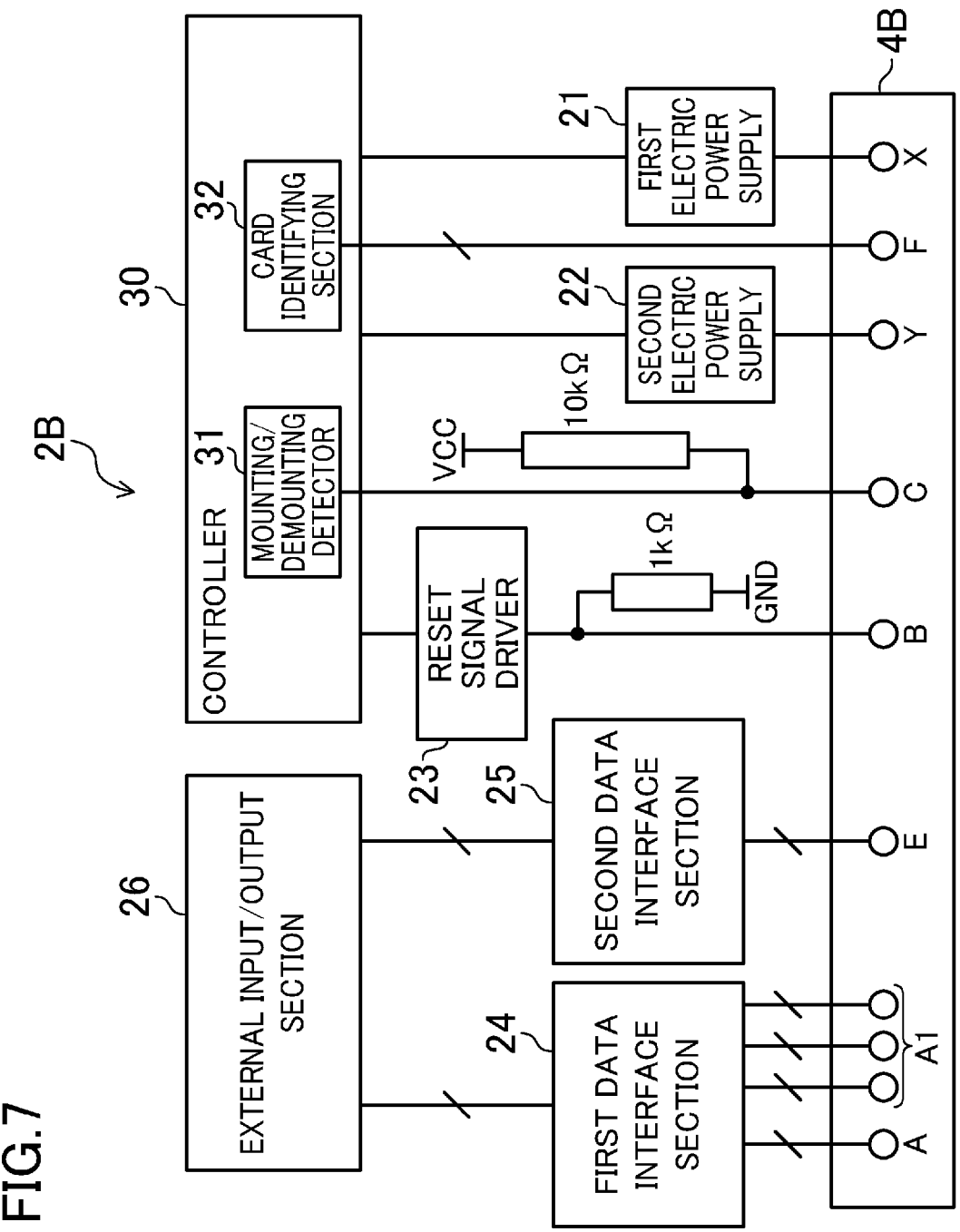
FIG. 7 is a view illustrating a configuration of a B-type memory card control device which performs data transfer with both the first and second memory cards.
Figure 8:
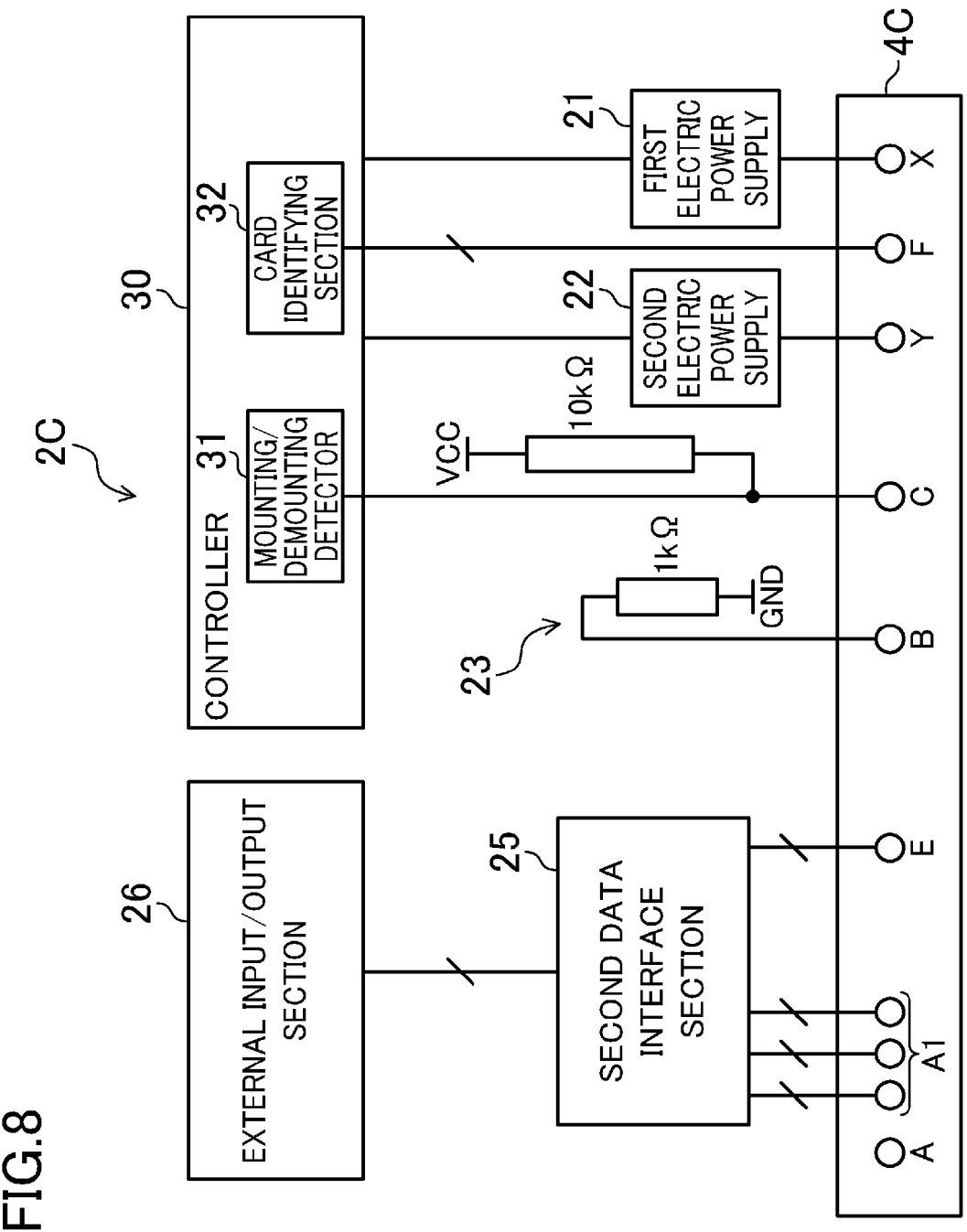
FIG. 8 is a view illustrating a configuration of a C-type memory card control device which performs high-speed data transfer with only the second memory card.
Figure 9:
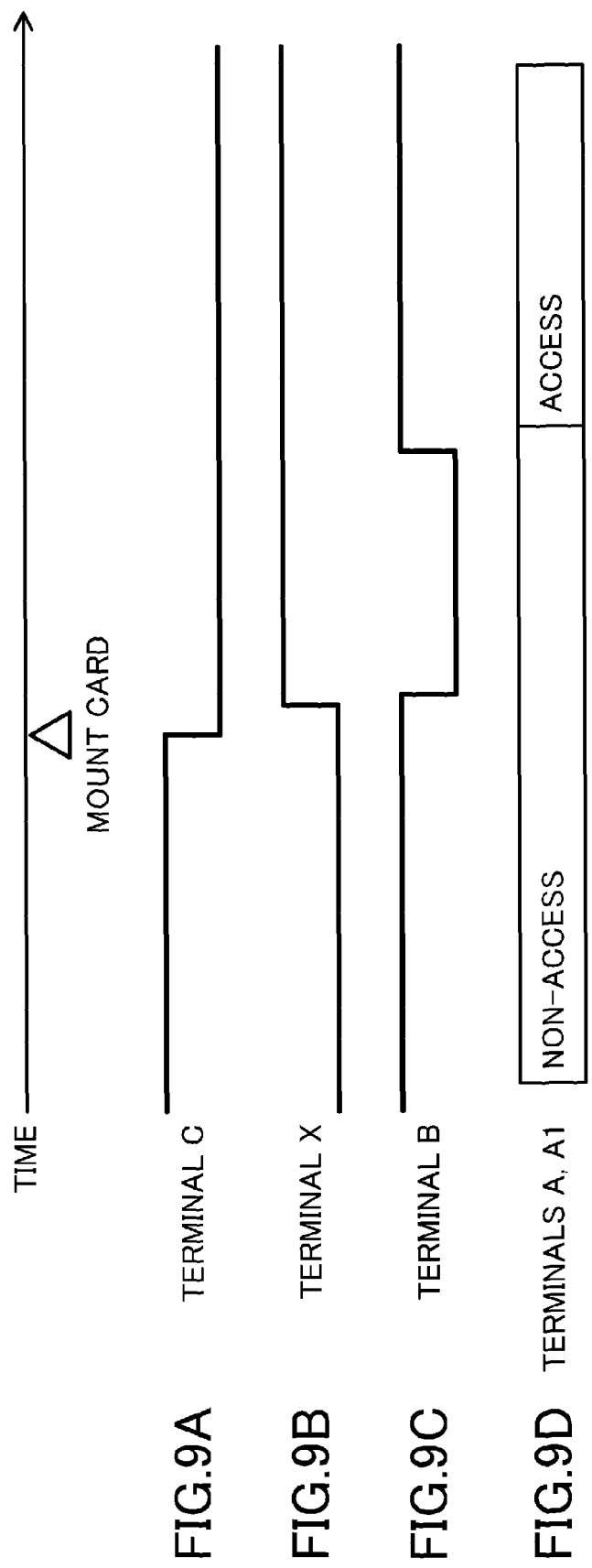
FIGS. 9A, 9B, 9C, and 9D are timing diagrams illustrating operation in the case of the first memory card being mounted in the A-type memory card control device.
Figure 10:
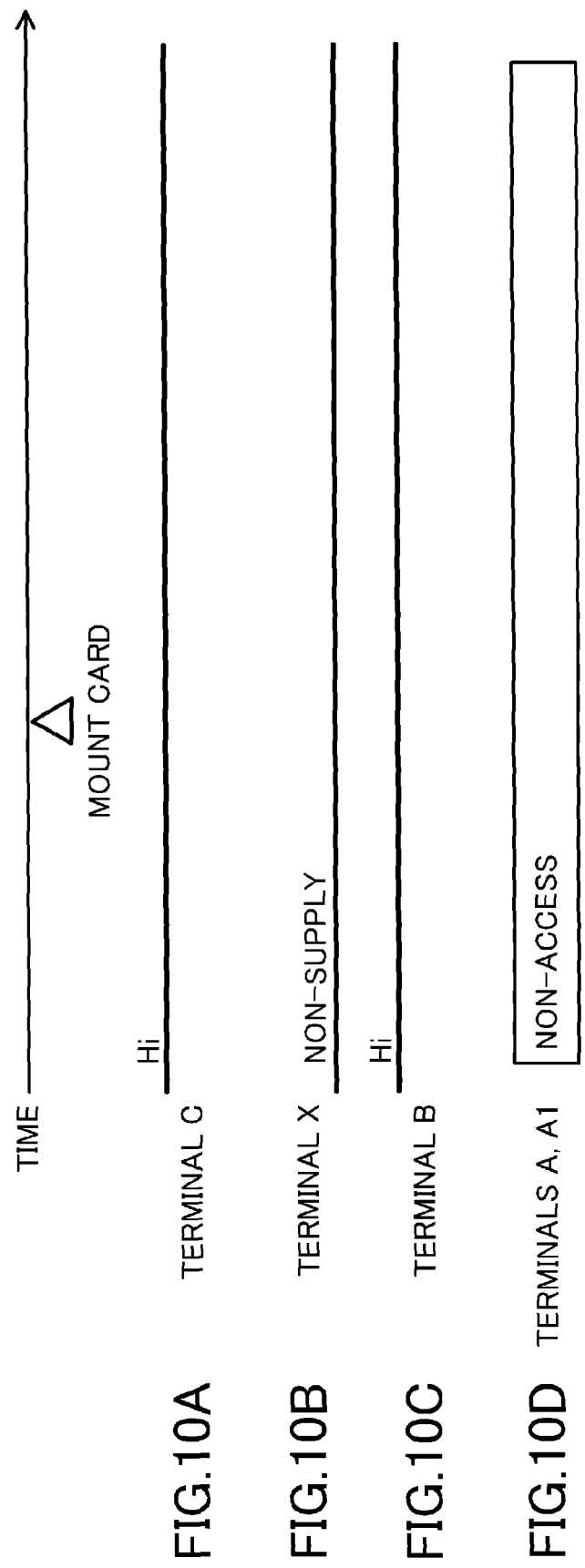
FIGS. 10A, 10B, 10C, and 10D are timing diagrams illustrating operation in the case of the second memory card being mounted in the A-type memory card control device.

FIGS. 6, 7, and 8 respectively show internal configurations of the A-type, B-type, and C-type memory card control devices.

The A-type memory card control device 2A illustrated in FIG. 6 performs data transfer only with the first memory card 1A. Circles in a memory card connector 4A represent memory card connector terminals. When the memory cards 1A, 1B are mounted in the memory card sockets 3, the terminals of the memory card connectors 4A are connected to the pins of the pin connector 10A of the memory card 1A of FIG. 3 and the pins of the pin connector 10B of the memory card 1B of FIG. 4 in such a one-to-one relationship that the reference symbols of the terminals correspond to the reference symbols of the pins.

First, the terminals of the memory card connector 4A of FIG. 6 will be described. A terminals of the memory card connector 4A are terminals exclusively used for the first data interface. A1 terminals of the memory card connector 4A are terminals used for both the first data interface and the second data interface. A C terminal of the memory card connector 4A is a terminal configured to detect mounting/demounting of the memory card, and is pulled up to power supply (VCC) by using a 10 kΩ resistor. That is, the C terminal is Hi when no memory card is mounted, and when it is detected that the C terminal is Lo, mounting of a memory card can be determined. Moreover, demounting of the memory card 1 from the memory card connector 4A can be detected by detecting transition of the C terminal from Lo to Hi. A B terminal of the memory card connector 4A supplies an interface reset signal to the memory card via the B terminal. An X terminal of the memory card connector 4A is a terminal for supplying electric power to the memory card 1.

Next, elements of FIG. 6 will be described. A mounting/demounting detector 31 detects mounting of a memory card in a memory card socket 3 when the C terminal of the memory card connector 4A is Lo. A first electric power supply 21 is a section for supplying electric power to the memory card 1, and supplies electric power to the memory card 1 via the X terminal of the memory card connector 4A. A reset signal driver 23 is a generator of an interface reset signal for resetting a first data interface section 11, and supplies Lo (a first potential) or Hi (a second potential) as the interface reset signal to the memory card 1 via the B terminal of the memory card connector 4A. A first data interface section 24 performs data transmission to and reception from the first data interface section 11 of the memory card 1 via the A terminals and the A1 terminals of the memory card connector 4A. An external input/output section 26 is an external input/output section of the memory card control device 2A, and a universal serial bus (USB) interface or the like is mounted on the external input/output section 26. As illustrated in FIG. 1, the external input/output section 26 is connected to the camera 7 via a USB connector 8. A controlling section 30 includes a micro-processing unit (MPU), includes a mounting/demounting detector 31, or the like, and controls timings and sequences of the elements.

Detailed process sequences in the case of the first memory card 1A being mounted in the A-type memory card control device 2A having the above-described configuration in the case of the second memory card 1B being mounted in the A-type memory card control device 2A having the above-described configuration will be described later.

FIG. 7 is a view illustrating an internal configuration of a B-type memory card control device 2B, and description of elements denoted by the same reference symbols as those in FIG. 6 will be omitted. The B-type memory card control device 2B performs data transfer with both the first memory card 1A and the second memory card 1B.

First, differences in a memory card connector 4B from the A-type memory card control device 2A will be described. The B-type memory card control device 2B uses E terminals, an F terminal, and a Y terminal which are not used in the memory card control device 2A. The E terminals of the memory card connector 4B are terminals exclusively used for the second data interface. The F terminal of the memory card connector 4B is a communication terminal of the card identifying information indicating that the mounted memory card is the second memory card. The Y terminal of the memory card connector 4B is a supply terminal of a second power supply, and after a mounted card has been recognized to be the second memory card, the Y terminal supplies second electric power to the memory card via the Y terminal.

Next, differences between elements of the B-type memory card control device 2B and elements of the A-type memory card control device 2A will be described. The B-type memory card control device 2B includes a second electric power supply 22, a second data interface section 25, and a card identifying section 32 in addition to the elements of the A-type memory card control device 2A. A B terminal of the memory card connector 4B is pulled down to GND by using a 1 kΩ resistor. Thus, the initial value of an interface reset signal is Lo. The reset signal driver 23 performs control such that the interface reset signal is kept Lo (the first potential) until a mounted memory card is determined not to be the second memory card 1B, and after the detection that the mounted card is not the second memory card 1B, the interface reset signal is set to Hi (the second potential). The card identifying section 32 acquires card identifying information transmitted via the F terminal of the memory card connector 4B, and determines whether or not the memory card is the second memory card 1B. When the mounted memory card is determined to be the second memory card 1B, the second electric power supply 22 and the second data interface section 25 are enabled. On the other hand, when the mounted memory card is determined to be the first memory card 1A, the first data interface section 24 is enabled, and after a predetermined time has elapsed, the reset signal driver 23 allows transition of the interface reset signal to Hi.

Detailed process sequences in the case of the first memory card 1A being mounted in the B-type memory card control device 2B having the above-described configuration and in the case of the second memory card 1B being mounted in the B-type memory card control device 2B having the above-described configuration will be described later.

FIG. 8 is a view illustrating an internal configuration of a C-type memory card control device 2C, and detailed description of elements denoted by the same reference symbols as those in FIGS. 6 and 7 will be omitted. The C-type memory card control device 2C can perform data transfer with the second memory card 1B at a higher speed than the B-type memory card control device 2B.

The C-type memory card control device 2C needs no first data interface, and an interface reset signal which is a reset signal of the first data interface is fixed to Lo. More specifically, a B terminal of a memory card connector 4C is pulled down to GND by using a 1 kΩ resistor. The C-type memory card control device 2C does not perform data transfer with the first memory card 1A. Thus, in the memory card connector 4C, A terminals exclusive for the first data interface are unused terminals, so that the first data interface section 24 is no longer necessary. On the other hand, in order to perform data transfer with the second memory card 1B at a higher speed, A1 terminals of the memory card connector 4B, which are connected to the first data interface section 24 in the B-type memory card control device 2B, are connected to the second data interface section 25 in the C-type memory card control device 2C. More specifically, when the second data interface section 25 performs data transfer using four lanes at a maximum, the basic lane uses E terminals of the memory card connector 4C, and additional three lanes use the A1 terminals of the memory card connector 4C.

Detailed process sequences in the case of the first memory card 1A being mounted in the C-type memory card control device 2C having the above-described configuration and in the case of the second memory card 1B being mounted in the C-type memory card control device 2C having the above-described configuration will be described later.

[2. Operation of Memory Card System]
[2-1. Operation on Memory Card Control Device of Type A]

FIGS. 9A-9D are views illustrating operation of the A-type memory card control device 2A when the first memory card 1A is mounted in the memory card control device 2A. Waveforms in FIGS. 9A-9D are waveforms of the connector terminals of the memory card control device 2A.

Terminal C of the memory card connector 4A is pulled up to the power supply (VCC) by using a 10 kΩ resistor in the memory card control device 2A, and has thus an initial value of Hi. When the first memory card 1A is mounted in the memory card socket 3 of the memory card control device 2A, each of the pins of the memory card 1A is connected to a corresponding one of the terminals of the memory card connector 4A. In the first memory card 1A, since the C pin of the pin connector 10A of the memory card connected to terminal C of the memory card connector 4A is fixed to Lo in the memory card, terminal C of the memory card connector 4A transitions from Hi to Lo. Thus, the mounting/demounting detector 31 of the memory card control device 2A determines that a memory card is mounted.

After the mounting/demounting detector 31 has determined that the memory card has been mounted, the controlling section 30 enables the first electric power supply 21, and supplies electric power via terminal X of the memory card connector 4A. In order to initialize the first data interface section 11 of the first memory card 1A, the reset signal driver 23 drives the interface reset signal to Lo via terminal B of the memory card connector 4A. Then, after a predetermined time has elapsed, the reset signal driver 23 allows transition of the interface reset signal to Hi. The first data interface section 24 performs data transfer with the memory card 1A via terminals A and terminals A1 of the memory card connector 4A.

With reference to FIGS. 10A-10D, operation of the A-type memory card control device 2A in the case of the second memory card 1B being mounted in the memory card control device 2A will be described.

The mounting/demounting detector 31 is connected to terminal C of the memory card connector 4A. Terminal C of the memory card connector 4A is pulled up to the power supply (VCC) by using a 10 kΩ resistor in the memory card control device 2A. Thus, the electric potential of terminal C of the memory card connector 4A is Hi in a situation in which no memory card is mounted.

When the second memory card 1B is mounted in the memory card socket 3 of the memory card control device 2A, each pin of the memory card 1B is connected to a corresponding one of the terminals of the memory card connector 4A. In the second memory card 1B, pin C of the pin connector 10B is connected to pin B of the pin connector 10B. Pin B of the pin connector 10B is connected, via terminal B of the memory card connector 4A, to the reset signal driver 23 for driving the interface reset signal.

That is, the mounting/demounting detector 31 connected to pin C of the pin connector 10B detects an interface reset signal of the reset signal driver 23 via terminal C of the memory card connector 4A and terminal B of the memory card connector 4A directly connected to terminal C in the memory card. The initial value of the interface reset signal is pulled up to VCC by using a 10 kΩ resistor at terminal C of the memory card connector 4A, and is thus Hi.

The reset signal driver 23 is configured to drive the interface reset signal to Lo after the mounting/demounting detector 31 has detected that terminal C of the memory card connector 4A has been Lo, and thus the controlling section 30 has determined that the memory card has been mounted. Therefore, the C terminal of the memory card connector 4A connected to the mounting/demounting detector 31 immediately after mounting of the memory card remains Hi, i.e., the initial state, and even after that, the C terminal is not driven to Lo. Therefore, the C terminal of the memory card connector 4A does not transition to Lo, and thus, the first electric power supply 21 is not enabled, so that even electric power is not supplied to the mounted second memory card 1B.

As described above, even when the second memory card 1B having the second data interface is mounted in the A-type memory card control device 2A which handles only the first memory card 1A having the first data interface, the mounting of the second memory card 1B is not detected, and electric power is not supplied to the second memory card 1B, so that circuits of the second memory card 1B and the memory card control device 2A are not broken.

Thus, in a memory card control device in which any ones of memory cards having a plurality of different data interfaces are mounted, connector terminals for both of the signals of the data interfaces can be used, so that it is possible to remove restrictions on the pin arrangement of a memory card.

[2-2. Operation in Memory Card Control Device of Type B]

The B-type memory card control device 2B can perform data transfer with both the first memory card 1A and the second memory card 1B.

First, it is determined whether or not a mounted memory card is the second memory card 1B. When the memory card is determined not to be the second memory card 1B, it is then determined whether or not the memory card is the first memory card 1A.

Figure 11:
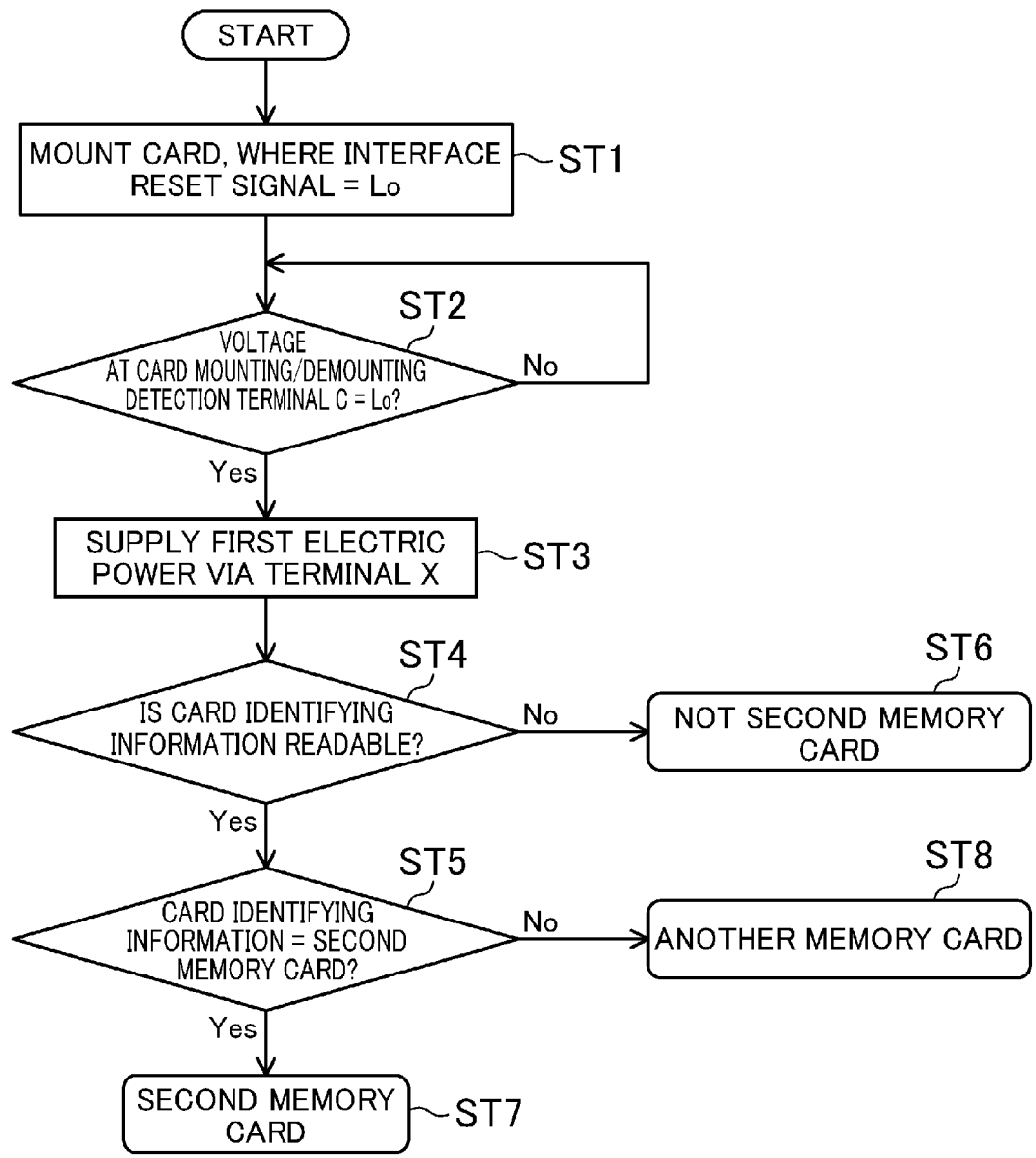
FIG. 11 is a flow chart illustrating processes of the B-type memory card control device.

FIG. 11 is a flow chart illustrating processes in the case of a memory card being mounted in the B-type memory card control device 2B. The process flow shown in the figure illustrates steps until it is determined whether or not the mounted memory card is the second memory card 1B.

With reference to the first memory card 1A illustrated in FIG. 3, the second memory card 1B illustrated in FIG. 4, the B-type memory card control device 2B illustrated in FIG. 7, and FIG. 11, a process flow in the case of a memory card being mounted in the B-type memory card control device 2B will be described in detail below.

In the B-type memory card control device 2B, an interface reset signal connected to terminal B of the memory card connector 4B is pulled down to GND by using a 1 kΩ resistor, and is thus Lo in the initial state (ST1).

The mounting/demounting detector 31 of FIG. 7 configured to detect mounting/demounting of a memory card monitors the electric potential of the terminal C of the memory card connector 4B. In a state in which no memory card is mounted in the B-type memory card control device 2B, terminal C of the memory card connector 4B is connected to VCC via a 10 kΩ resistor, and thus the electric potential of terminal C of the memory card connector 4B is Hi. The mounting/demounting detector 31 determines that a memory card is mounted when the electric potential of terminal C of the memory card connector 4B transitions to Lo (ST2).

Here, when the first memory card 1A is mounted, pin C of the memory card which is connected to terminal C of the memory card connector 4B is fixed to Lo in the memory card (see FIG. 3), and thus the mounting/demounting detector 31 can detect the mounting of the memory card.

When the second memory card 1B is mounted, pin C of the memory card which is connected to terminal C of the memory card connector 4B is directly connected to pin B of the memory card in the memory card, and pin B of the memory card is connected to the interface reset signal via terminal B of the memory card connector 4B (see FIG. 4). Since the interface reset signal connected to terminal B of the memory card connector 4B is pulled down to GND by using a 1 kΩ resistor, terminal C of the memory card connector 4B has an electric potential (=0.09×VCC) pulled down to GND by using a 1 kΩ resistor and pulled up to VCC by using a 10 kΩ resistor. Thus, the mounting/demounting detector 31 connected to terminal C of the memory card connector 4B detects that the detection signal is Lo, thereby determining that a memory card is mounted.

As described above, after the mounting of a memory card has been determined in step ST2, the controlling section 30 enables the first electric power supply 21, and supplies first electric power to the memory card via terminal X of the memory card connector 4B (ST3).

Next, the B-type memory card control device 2B reads card identifying information via terminal F of the memory card connector 4B. The card identifying information transfer section 15 for transferring the card identifying information is provided in the second memory card 1B and is not provided in the first memory card 1A (see FIGS. 3 and 4).

Transfer of card identifying information of the card identifying information transfer section 15 is performed by a total of two interfaces including a data transfer clock and a data line. For example, the data line is Hi while no transfer is performed, and when transfer is started, the data line is driven at Lo for a period corresponding to one clock of the data transfer clock. Then, card identifying information corresponding to predetermined bytes is transferred in synchronization with the data transfer clock.

In this case, in the card identifying section 32, if the data line does not transition to Lo at the start of the transfer, the card identifying information cannot be read (No in ST4). Therefore, the memory card is at least determined not to be the second memory card 1B (ST6). On the other hand, the card identifying section 32 determines, when the data line transitions to Lo at the start of the transfer, that there is a possibility that the memory card is the second memory card 1B (Yes in ST4).

Next, in the card identifying section 32, card identifying information acquired from the memory card is compared with and checked against desired identifying information (ST5). If the card identifying information acquired from the memory card is the desired identifying information, the card identifying section 32 determines that the memory card is the second memory card 1B (ST7). If the card identifying information acquired from the memory card is not the desired identifying information, the card identifying section 32 determines that the memory card is another memory card (ST8).

When the memory card is determined to be the second memory card 1B (ST7), the second data interface section 25 and the second electric power supply 22 are enabled, and second electric power is supplied to the second memory card 1B via terminal Y of the memory card connector 4B, thereby enabling the second data interface section 14 in the second memory card 1B to which electric power is supplied by the second power supply. After a predetermined time has elapsed, data transfer with the second memory card 1B is performed via connector terminals E by the second data interface section 25.

When the first memory card 1A is mounted, the process proceeds to step ST6 after steps ST1-ST4. Step ST6 represents a state where the memory card has been determined not to be the second memory card 1B. A subsequent process flow to determine that the memory card is the first memory card 1A will be described with reference to FIG. 12.

Figure 12:
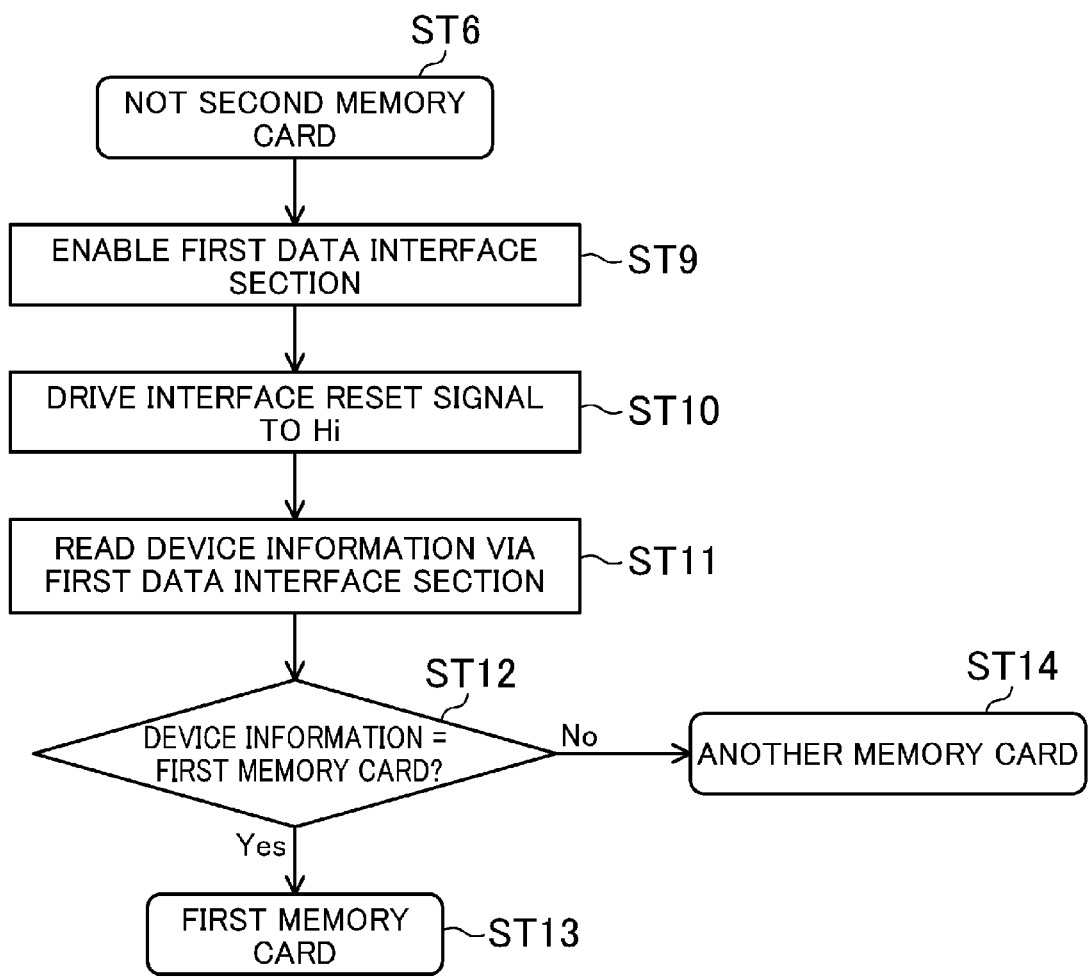
FIG. 12 is a flow chart illustrating processes of the B-type memory card control device in the case of a memory card other than the second memory card being mounted.

In the state in step ST6 of FIG. 12, the interface reset signal has been driven to Lo. As illustrated in FIG. 3, the interface reset signal is supplied to the first data interface section 11 of the first memory card 1A via pin B of the memory card.

When the first data interface section 24 of the memory card control device 2B is enabled, the first data interface section 24 supplies a first data interface clock to the first data interface section 11 of the memory card with the interface reset signal being in a Lo state, thereby initializing the first data interface section 11 (ST9).

After a predetermined time has elapsed, the reset signal driver 23 drives the interface reset signal to Hi (ST10), and device information registered in a register of the first data interface section 11 of the memory card is read by the first data interface section 24 (ST11). Then, the device information read in step ST11 is compared with and checked against the desired device information of the first memory card (ST12). If the device information read in step ST11 matches the desired device information, the memory card is determined to be the first memory card (ST13), and if the device information read in step ST11 does not match the desired device information, the memory card is determined to be another memory card (ST14).

As described above, in the B-type memory card control device 2B, the first electric power is supplied to the mounted memory card while the interface reset signal is driven to Lo, and after the type of the memory card has been determined, interface signals of the memory card and the control device are enabled, so that data transfer is possible both in the case where the memory card is the first memory card 1A, and in the case where the memory card is the second memory card 1B.

[2-3. Operation in Memory Card Control Device of Type C]

In the C-type memory card control device 2C, it is determined whether or not a mounted memory card is the second memory card 1B. If the memory card is the second memory card 1B, the C-type memory card control device 2C can perform data transfer with the second memory card 1B at a higher speed than the B-type memory card control device 2B.

In the C-type memory card control device 2C, the A1 terminals of the memory card connector 4B, which are used by the first data interface section 24 of B-type memory card control device 2B, are used as additional lanes of the second data interface section 25, so that data transfer at a higher speed than that of the B-type memory card control device 2B is possible.

Operation in the case of the first memory card 1A being mounted in the C-type memory card control device 2C is similar to that illustrated in FIG. 11, and the operation ends at the situation of step ST6. On the other hand, operation in the case of the second memory card 1B being mounted in the C-type memory card control device 2C proceeds to a flow illustrated in FIG. 13 after the flow illustrated in FIG. 11.

Figure 13:
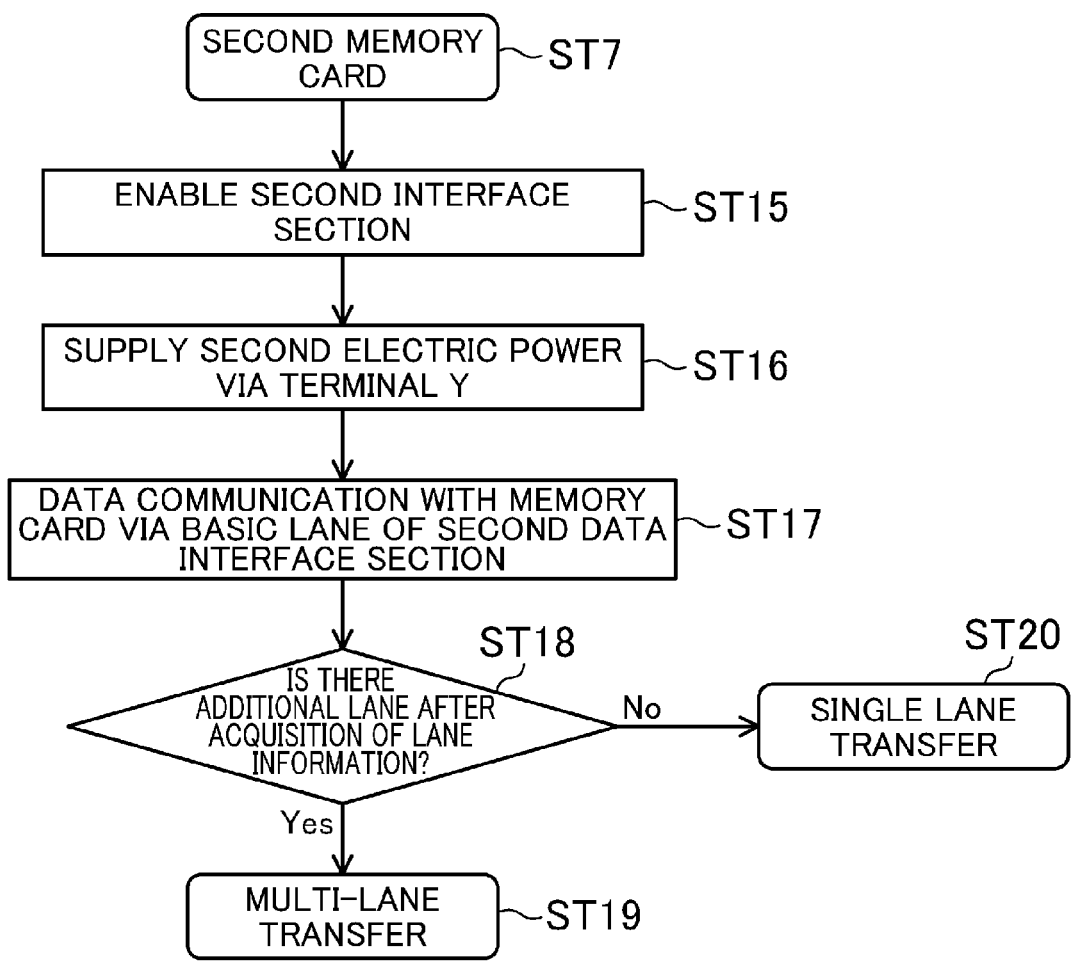
FIG. 13 is a flow chart illustrating processes of the C-type memory card control device.

The flow after a state in which the memory card has been determined to be the second memory card 1B (ST7 in FIGS. 11 and 13) will be described below with reference to FIG. 13.

When the memory card mounted in the C-type memory card control device 2C is determined to be the second memory card 1B, the second data interface section 25 is enabled (ST15). Then, the second electric power supply 22 supplies the second electric power to the mounted memory card 1B via the Y terminal of the memory card connector 4C (ST16). After a predetermined time has elapsed since the supply of the second electric power was started, the second data interface section 25 of the memory card control device 2C starts operating the basic lane to establish communication with the second data interface section 14 of the mounted memory card 1B via the E terminals of the memory card connector 4C (ST17). The lane information of the memory card 1B is acquired, and it is determined whether or not the memory card 1B has additional lanes (ST18). If the memory card 1B does not have additional lanes, single lane transfer using only the basic lane is performed (ST20), and if the memory card 1B is determined to have the additional lanes, multi-lane transfer is performed (ST19).

When the multi-lane transfer is performed, not only the E terminals but also the A1 terminals of the memory card connector 4C are used. As illustrated in FIGS. 5B0-5B3, multi-lane transfer in which data is distributed byte by byte to four lanes in an interleaved pattern is performed.

As described above, in the C-type memory card control device 2C, the A1 terminals of the memory card connector 4C are used as additional lanes of the second data interface section 25, so that the A1 terminals of the memory card connector 4C each can be connected to a different one of pins A1 for additional lanes of the second data interface section 14 of the second memory card 1B. Thus, it is possible to provide a memory card control device 2C compliant with multi-lane transfer of the second memory card 1B and capable of allowing data transfer at a higher speed.

[3. Advantages, Etc.]

According to the embodiment, as illustrated in FIG. 4, card detection pin C and input pin B configured to receive the interface reset signal are connected to each other in the second memory card 1B. Therefore, even if the second memory card 1B is mounted in the A-type memory card control device 2A which handles only the first memory card 1A, the mounting of the second memory card 1B is not detected, so that electric power is not supplied to the second memory card 1B. Thus, it is possible to prevent malfunction of the memory card control device 2A and an electric breakdown of the second data interface 14 in the second memory card 1B and the first data interface 24 in the memory card control device 2A in the case where the second memory card 1B is mounted in the A-type memory card control device 2A which handles only the first memory card 1A.

As illustrated in FIG. 7, the memory card control device 2B performs control such that the initial value of the interface reset signal is set to a first electric potential, and after the detection that the mounted memory card is not the second memory card 1B, the interface reset signal is changed to a second electric potential, so that it is possible to provide the memory card control device 2B allowing data transfer with both the first memory card 1A and the second memory card 1B. For example, when the first memory card 1A is a PCI bus memory card, and the second memory card 1B is a PCI-Express bus memory card, both the memory cards can be used in the same environment.

Furthermore, as illustrated in FIG. 8, when the second data interface section 25 includes a basic lane and additional lanes, and in the second memory card 1B, the basic lane is assigned to unused pins (e.g., pins E) of the first memory card 1A, and the additional lanes are assigned to pins (e.g., pins A1) of the first data interface section 11 of the first memory card 1A, data transfer at a much higher speed is possible by the memory card control device 2C compliant with additional lanes.

(Other Embodiments)

As described above, the embodiments have been described as example techniques disclosed in the present application. However, the techniques according to the present disclosure are not limited to these embodiments, but are also applicable to those where modifications, substitutions, additions, and omissions are made. In addition, elements described in the embodiments may be combined to provide a different embodiment.

Now, other embodiments will be described below.

Although the second data interface is a PCI-express bus in the present embodiment, the present invention is not limited to this. The second data interface may be another data interface relating to high-speed serial transfer. Although the multi-lane transfer by the second data interface using four lanes has been described, transfer can be performed by using two or more lanes.

Although the system in the card identifying information transfer section 15 of the second memory card 1B is I2C, the present invention is not limited to this. Any system may be possible as long as information indicating that the memory card is the second memory card 1B can be transferred.

Although the controlling section 30 of the memory card control device is MPU, a dedicated hardware may be used.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure provides high-speed data transfer memory card which includes no additional pin, and causes neither malfunction nor electric breakdown even when the high-speed data transfer memory card is mounted in a memory card control device noncompliant with the high-speed data transfer memory card. The present disclosure also provides a memory card control device having an interface compliant with the high-speed data transfer memory card. Therefore, the present disclosure can be utilized in the field of digital cameras, and the like requiring high-speed data transfer.

What is claimed is:

1. A memory card, access to which is controlled by a memory card control device, the memory card comprising:
   a card detection pin configured to allow the memory card control device to detect mounting/demounting of the memory card, the card detection pin being coupled to a first terminal of the memory card; and
   an input pin configured to receive an interface reset signal output from the memory card control device, the input pin being coupled to a second terminal of the memory card, the second terminal being different from the first terminal, wherein
   the card detection pin and the input pin configured to receive the interface reset signal are connected to each other in the memory card.

2. A memory card control device for controlling access to a memory card, the memory card control device comprising:
   a reset signal driver configured to drive an interface reset signal to the memory card at a first electric potential;
   a mounting/demounting detector configured to determine that the memory card is mounted when an electric potential of a terminal connected to a card detection pin of the memory card via a memory card connector of the memory card control device is the first electric potential, and
   that the memory card is not mounted when the electric potential of the terminal connected to the card detection pin of the memory card is a second electric potential,
   a first electric power supply configured to, only when the mounting/demounting detector determines that the memory card is mounted, supply first electric power to the mounted memory card via a first electric power supply terminal;
   a card identifying section configured to receive card identifying information transmitted from the mounted memory card by supplying the first electric power to the mounted memory card, and determine whether or not the mounted memory card is a specific type of memory card,
   a second electric power supply configured to, only when the card identifying section determines that the mounted memory card is the specific type of memory card, supply second electric power to the mounted memory card via a second electric power supply terminal which is different from the first electric power supply terminal; and
   a data interface section configured to perform date transfer with the mounted memory card via an interface enabled in the mounted memory card by supplying the second electric power to the mounted memory card when the mounted memory card is the specific type of memory card.

3. The memory card control device of claim 2, wherein
   the reset signal driver has a function of driving the interface reset signal to transition from the first electric potential to the second electric potential when the card identifying section determines that the mounted memory card is not the specific type of memory card, and
   the memory card control device further includes another data interface section configured to perform data transfer with the mounted memory card via an interface enabled in the memory card by supplying the first electric power to the mounted memory card after transition of the interface reset signal from the first electric potential to the second electric potential.

4. The memory card control device of claim 2, wherein
   the reset signal driver has a function of driving the interface reset signal to fix the interface reset signal at the first electric potential.

5. The memory card control device of claim 2, wherein
   when the data interface section acquires information that the memory card has at least one additional lane from the memory card by using a basic lane, the data interface section performs multi-lane transfer using the basic lane and the additional lane.

6. The memory card control device of claim 5, wherein
   a terminal for the additional lane in the memory card connector is assigned to a terminal which should be used assuming that there is an interface enabled when the first electric power is supplied to the mounted memory card.

\* \* \* \* \*